United States Patent
Guo et al.

(10) Patent No.: US 12,461,167 B2
(45) Date of Patent: Nov. 4, 2025

(54) DETECTING A SHORT IN A POWER SUPPLY UNIT

(71) Applicant: Dell Products L.P., Round Rock, TX (US)

(72) Inventors: Tongsheng Guo, Shanghai (CN); Ruifeng Jin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/519,192

(22) Filed: Nov. 27, 2023

(65) Prior Publication Data

US 2025/0116725 A1   Apr. 10, 2025

(30) Foreign Application Priority Data

Oct. 9, 2023   (CN) ................. 202311306105.5

(51) Int. Cl.
 *G01R 31/40*   (2020.01)
 *G01R 31/52*   (2020.01)
(52) U.S. Cl.
 CPC ........... *G01R 31/40* (2013.01); *G01R 31/52* (2020.01)
(58) Field of Classification Search
 CPC .................. G01R 31/40; G01R 31/52
 USPC ................. 324/764.01, 537, 500
 See application file for complete search history.

(56) References Cited

U.S. PATENT DOCUMENTS

| | | | |
|---|---|---|---|
| 2013/0038343 A1* | 2/2013 | Tu ............ | G01R 31/40 |
| | | | 324/754.03 |
| 2021/0382104 A1* | 12/2021 | Becker ........ | G01R 31/52 |
| 2025/0093403 A1* | 3/2025 | Shi ........... | G01R 31/2843 |

* cited by examiner

*Primary Examiner* — Giovanni Astacio-Oquendo
(74) *Attorney, Agent, or Firm* — McDermott Will & Schulte LLP

(57) ABSTRACT

Detecting a short in a PSU, including setting an input of a relay to establish a first power path between an input of the PSU and a low voltage output of an auxiliary PSU; receiving an input power signal and converting a first voltage of the input power signal to a second voltage; outputting, at the low voltage output, an output power signal having the second voltage to provide the output power signal through a resistor and to the input of the relay; measuring, by the MCU, a voltage at a terminal between the resistor and the input of the relay and determining that the voltage at the terminal is less than a first threshold, and in response, determining, that the voltage at the terminal is less than a second threshold, and in response, maintaining the first power path such that the PSU does not receive the input power signal.

20 Claims, 5 Drawing Sheets

DETECTING A SHORT IN A POWER SUPPLY UNIT

BACKGROUND

Field of the Disclosure

The disclosure relates generally to power supply units, and in particular, detecting a short in a power supply unit for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power supply units (PSUs) are essential components in electronic devices, converting electrical energy from a source into the appropriate form for the device. PSUs provide stable and regulated voltages to ensure proper operation of components. Reliable PSUs are crucial for the longevity and stability of information handling systems

SUMMARY

Innovative aspects of the subject matter described in this specification may be embodied in a method of detecting a short in a power supply unit (PSU), including: setting, by a microcontroller unit (MCU), an input of a relay to establish a first power path between an input of the PSU and a low voltage output of an auxiliary PSU; receiving, at the auxiliary PSU, an input power signal; converting, by the auxiliary PSU, a first voltage of the input power signal to a second voltage; outputting, at the low voltage output of the auxiliary PSU, an output power signal having the second voltage to provide the output power signal through a resistor and to the input of the relay; measuring, by the MCU, a voltage at a terminal between the resistor and the input of the relay; determining, by the MCU and based on the measuring, that the voltage at the terminal is less than a first threshold; in response to determining that the voltage at the terminal is less than the first threshold, determining, by the MCU and based on the measuring, that the voltage at the terminal is less than a second threshold; in response to determining that the voltage at the terminal is less than the second threshold: maintaining, by the MCU, the first power path such that the PSU does not receive the input power signal.

Other embodiments of these aspects include corresponding systems and apparatus.

These and other embodiments may each optionally include one or more of the following features. For instance, the second voltage is less than the first voltage. The second voltage is approximately 5 volts. Further in response to determining that the voltage at the terminal is less than the second threshold, providing a notification indicating a fault of the PSU. Setting the input of the relay to establish the first power path further includes: setting, by the MCU, a transistor to an off-state that is coupled to a control terminal of the relay such that the input of the relay is set to establish the first power path between the input of the PSU and the low voltage output of the auxiliary PSU. Setting the transistor to the off-state includes setting a voltage of the transistor to 0 volts. Determining, by the MCU and based on the measuring, that the voltage at the terminal is greater than the first threshold; in response to determining that the voltage at the terminal is greater than the first threshold: setting, by the MCU, the input of the relay to establish a second power path between the input of the PSU and the input power signal. Setting the input of the relay to establish the second power path further includes: setting, by the MCU, a transistor to an on-state that is coupled to a control terminal of the relay such that the input of the relay is set to establish the second power path between the input of the PSU and the input power signal. Setting the transistor to the on-state includes setting a voltage of the transistor to 5 volts. Determining, by the MCU and based on the measuring, that the voltage at the terminal is greater than the second threshold; in response to determining that the voltage at the terminal is less than the second threshold, receiving user input indicating to apply the input power signal to the PSU; and in response to the user input, setting, by the MCU, the input of the relay to establish a second power path between the input of the PSU and the input power signal.

Particular implementations of the subject matter described in this specification can be implemented so as to realize one or more of the following advantages. For example, unexpected AC breaker trips of a facility are prevented; avoiding healthy platform shutdowns at the facility; and quick identification of failed power supply units.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
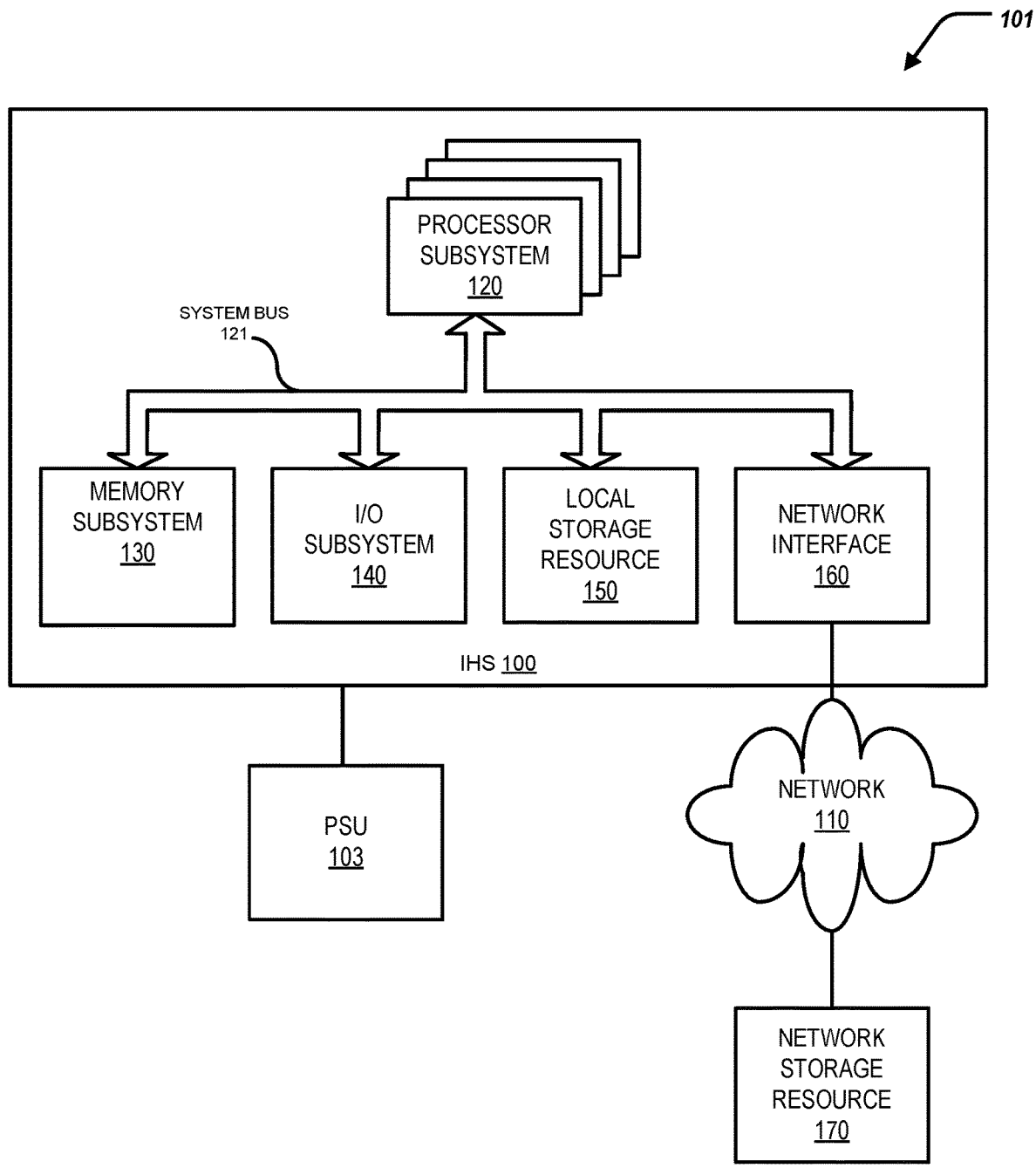
FIG. 1 is a block diagram of selected elements of an embodiment of an information handling system.

This disclosure discusses methods and systems for detecting a short/fault in a power supply unit (PSU) of an information handling system. In short, the PSU connects to a power source to provide power to the information handling system. However, the PSU can include a fault (short), and as a result, a facility break can occur. The PSU 206 and/or the information handling system 202 can be identified and isolated.

Specifically, this disclosure discusses a system and a method for detecting a short in a power supply unit (PSU), including setting, by a microcontroller unit (MCU), an input of a relay to establish a first power path between an input of the PSU and a low voltage output of an auxiliary PSU; receiving, at the auxiliary PSU, an input power signal; converting, by the auxiliary PSU, a first voltage of the input power signal to a second voltage; outputting, at the low voltage output of the auxiliary PSU, an output power signal having the second voltage to provide the output power signal through a resistor and to the input of the relay; measuring, by the MCU, a voltage at a terminal between the resistor and the input of the relay; determining, by the MCU and based on the measuring, that the voltage at the terminal is less than a first threshold; in response to determining that the voltage at the terminal is less than the first threshold, determining, by the MCU and based on the measuring, that the voltage at the terminal is less than a second threshold; in response to determining that the voltage at the terminal is less than the second threshold: maintaining, by the MCU, the first power path such that the PSU does not receive the input power signal.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure and a power supply unit (PSU) 103. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The PSU 103 can be coupled to the IHS 100.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
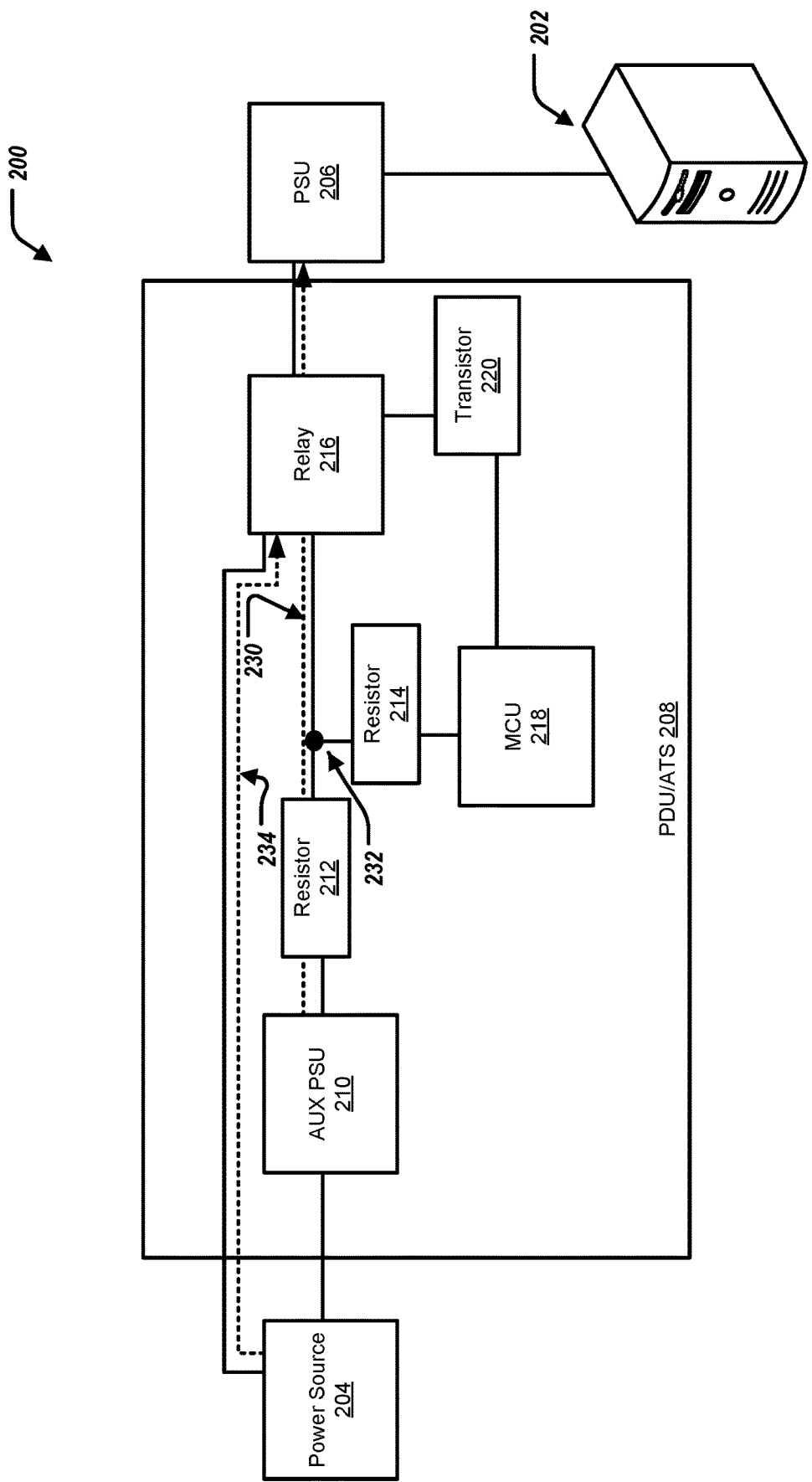
FIG. 2 illustrates a block diagram of an apparatus for detecting faults in a power supply unit for the information handling system, in a first implementation.

Turning to FIG. 2, FIG. 2 illustrates an environment 200 including an information handling system 202, a power source 204, a power supply unit (PSU) 206, and a power distribution unit (PDU)/automatic transfer switch (ATS) 208. The PDU/ATS 208 can include an auxiliary power supply unit (PSU) 210, a first resistor 212, a second resistor 214, a relay 216, a microcontroller unit (MCU) 218, and a transistor 220. In some examples, the information handling system 202 is similar to, or includes, the information handling system 100 of FIG. 1. In some examples, the PSU 206 is similar to, or includes the PSU 103 of FIG. 1.

The power source 204 can be in communication with the auxiliary PSU 210 and the relay 216. The auxiliary PSU 210 can be in communication with the power source 204 and the resistor 212. The resistor 212 can be in communication with the resistors 214 and the relay 216. The resistor 214 can be in communication with the resistors 212, the relay 216, and the MCU 218. The MCU 218 is in communication with the resistor 214 and the transistor 220. The relay 216 is in communication with the resistor 212, the resistor 214, and the PSU 206. The transistor 220 is in communication with the MCU 218 and the relay 216. The PSU 206 is in communication with the relay 216 and the information handling system 202.

In short, the PSU 206 connects to the power source 204 to provide power to the information handling system 202. However, the PSU 206 can include a fault (short), and as a result, a breaker (not shown) can trip. The PDU/ATS 208 can detect such a fault and isolate the PSU 206 and/or the information handling system 202.

Specifically, the MCU 218 can set an input of the relay 216 to establish a first power path 230 between an input of the PSU 206 and a low voltage output of the auxiliary PSU 210. In particular, the transistor 220 can be coupled to a control terminal of the relay 216. Based on the state of the control terminal of the relay 216, the relay 216 selects one of the inputs to the relay 216 to pass through to the output of the relay 216. Specifically, the MCU 218 can set the transistor 220 in an off-state—e.g., set an input voltage of the transistor 220 to 0 volts. When the transistor 220 is in the off-state, the transistor 220 can set the control terminal of the relay 216 such that the input of the relay 216 selects the first power path 230 to establish the first power path 230 between the input of the PSU 206 and the low voltage output of the auxiliary PSU 210.

The auxiliary PSU 210 receives the input power signal from the power source 204. The auxiliary PSU 210 converts a first voltage of the input power signal to a second voltage. That is, the auxiliary PSU 210 adjusts the first voltage to a lower, second voltage. In some examples, the first voltage is 120 Volts. In some examples, the second voltage is 5 Volts.

The auxiliary PSU 210 outputs, at the low voltage output of the auxiliary PSU 210, an output power signal. The output power signal has the second voltage. The output power signal is provided through the resistor 212 and to the input of the relay 216.

The MCU 218 measures a voltage at terminal 232. The terminal 232 is between the resistor 212 and the input of the relay 216. The MCU 218 determines, based on the measuring, whether the voltage at terminal 232 is less than a first threshold. For example, the first threshold is 3.8 Volts.

In some cases, the MCU 218 determines that the voltage at the terminal 232 is less than the first threshold. When the MCU 218 determines that the voltage at the terminal 232 is less than the first threshold, the MCU 218, in response, determines, based on the measuring, whether the voltage at the terminal 232 is less than a second threshold. For example, the second threshold is 2.8 Volts. For example, the second threshold is 2.1 Volts.

In some cases, the MCU 218 determines that the voltage at the terminal 232 is less than the second threshold. When the MCU 218 determines that the voltage at the terminal 232 is less than the second threshold, the MCU 218, in response, maintains the first power path 230 such that the PSU 206 does not receive the input power signal. That is, the MCU 218 keeps/maintains the voltage of the transistor 220 at 0 Volts (the transistor 220 in an off power state) such that the control terminal of the relay 216 indicates to select the first power path 230 to maintain the first power path 230 between the input of the PSU 206 and the low voltage output of the auxiliary PSU 210. In other words, the PSU 206 does not receive the input power signal.

In some examples, the MCU 218, further in response to determining that the voltage at the terminal 232 is less than the second threshold, provides a notification indicating a fault of (or at) the PSU 206. For example, the notification can include a notification via a communication interface-a display coupled to the information handling system 200 or secondary computing device associated with the information handling system 202, or associated with a user/manager of the information handling system 202. For example, the notification can include a sound alert-via a speaker coupled to the information handling system 202.

In some cases, the MCU 218 determines that the voltage at the terminal 232 is greater than the first threshold. When the MCU 218 determines that the voltage at the terminal 232 is greater than the first threshold, the MCU 218, in response, sets the input of the relay 216 to establish a second power path 234 between and the input of the PSU 206 and the input power signal. As mentioned herein, the transistor 220 can be coupled to the control terminal of the relay 216. Based on the state of the control terminal of the relay 216, the relay 216 selects one of the inputs to the relay 216 to pass through to the output of the relay 216. Specifically, the MCU 218 can set the transistor 220 in an on-state—e.g., set an input voltage of the transistor 220 to 5 volts. When the transistor 220 is in the on-state, the transistor 220 can set the control terminal of the relay 216 such that the input of the relay 216 selects the second power path 234 to establish the second power path 232 between the input of the PSU 206 and the input power signal.

In some cases, the MCU 218 determines that the voltage at the terminal 232 is greater than the second threshold. When the MCU 218 determines that the voltage at the terminal 232 is greater than the second threshold, the MCU 218, in response, receives user input indicting to apply the input power signal to the PSU. That is, the user input "overrides" the first power path 232 to indicate the input power signal is to be applied to the PSU 206 via the second power path 234. The MCU 218, in response to the user input, sets the input of the relay 216 to establish the second power path 234 between and the input of the PSU 206 and the input power signal.

Figure 3:
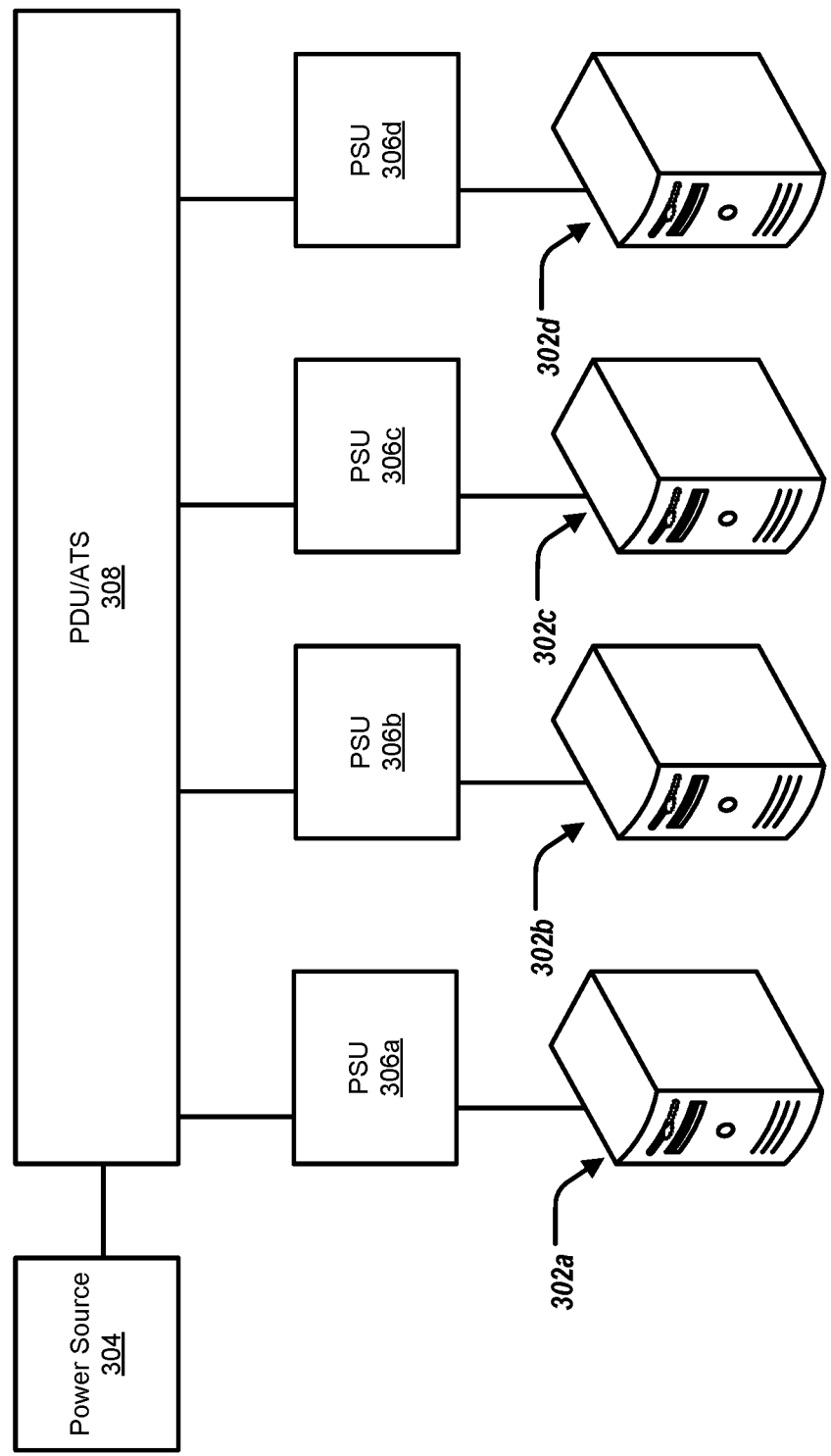
FIG. 3 illustrates a computing environment including multiple information handling systems and respective power supply units.

FIG. 3 illustrates a computing environment 300. The computing environment 300 can include a power source 304; a PDU/ATS 308; PSUs 306a, 306b, 306c, 306d (collectively referred to as PSUs 306); and information handling systems 302a, 302b, 302c, 302d (collectively referred to as information handling systems 302). The power source 304 can be similar to the power source 204 of FIG. 2; the PDU/ATS 308 can be similar to the PDU/ATS 208 of FIG. 2; the PSU 306 can be similar to the PSU 206 of FIG. 2; and the information handling system 302 can be similar to the information handling system 202 of FIG. 2. The PDU/ATS 308 can include multiple relays 216, resistors 212, resistors 214 of the PDU/ATS 208 and a single MCU 218 and a single auxiliary PSU 210 of the PDU/ATS 208.

To that end, when any of the PSUs 306 fail (as described with respect to FIG. 2), the PDU/ATS 308 can shut down only the PSU 306 that has failed (and not each of the PSUs 306), similar to that as described with respect to FIG. 2. That is, when the PDU/ATS 308 detects a failure/fault/short in one of the PSUs 306 (e.g., a voltage at the terminal 232 is below the second threshold), the PSU 306 can prevent the input power signal from the power source 304 from reaching the PSU 306 that has failed, while allowing the power signal to reach the other PSUs 306 that are working.

Figure 4:
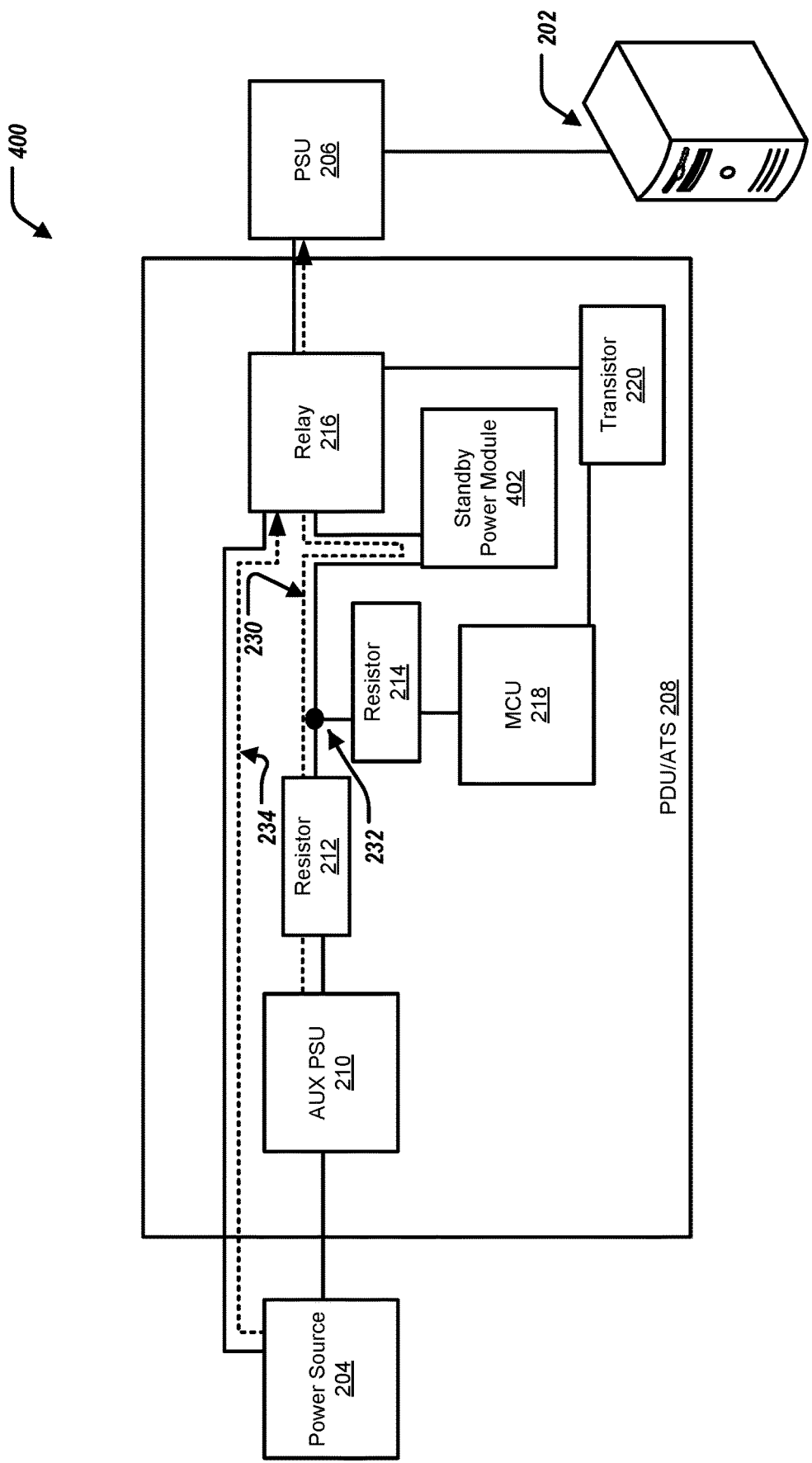
FIG. 4 illustrates a block diagram of an apparatus for detecting faults in a power supply unit for the information handling system, in a second implementation.

FIG. 4 illustrates a computing environment 400, similar to the computing environment 200. Specifically, the PDU/ATS 208 can further include a standby transistor switch 402. The standby transistor switch 402 can be in communication between the resistor 212 and the relay 216. The standby transistor switch 402 can, in response to the voltage at the terminal 232 being below the first threshold and/or the second threshold, can remove power from being provided through the resistor 212 for power savings.

Figure 5:
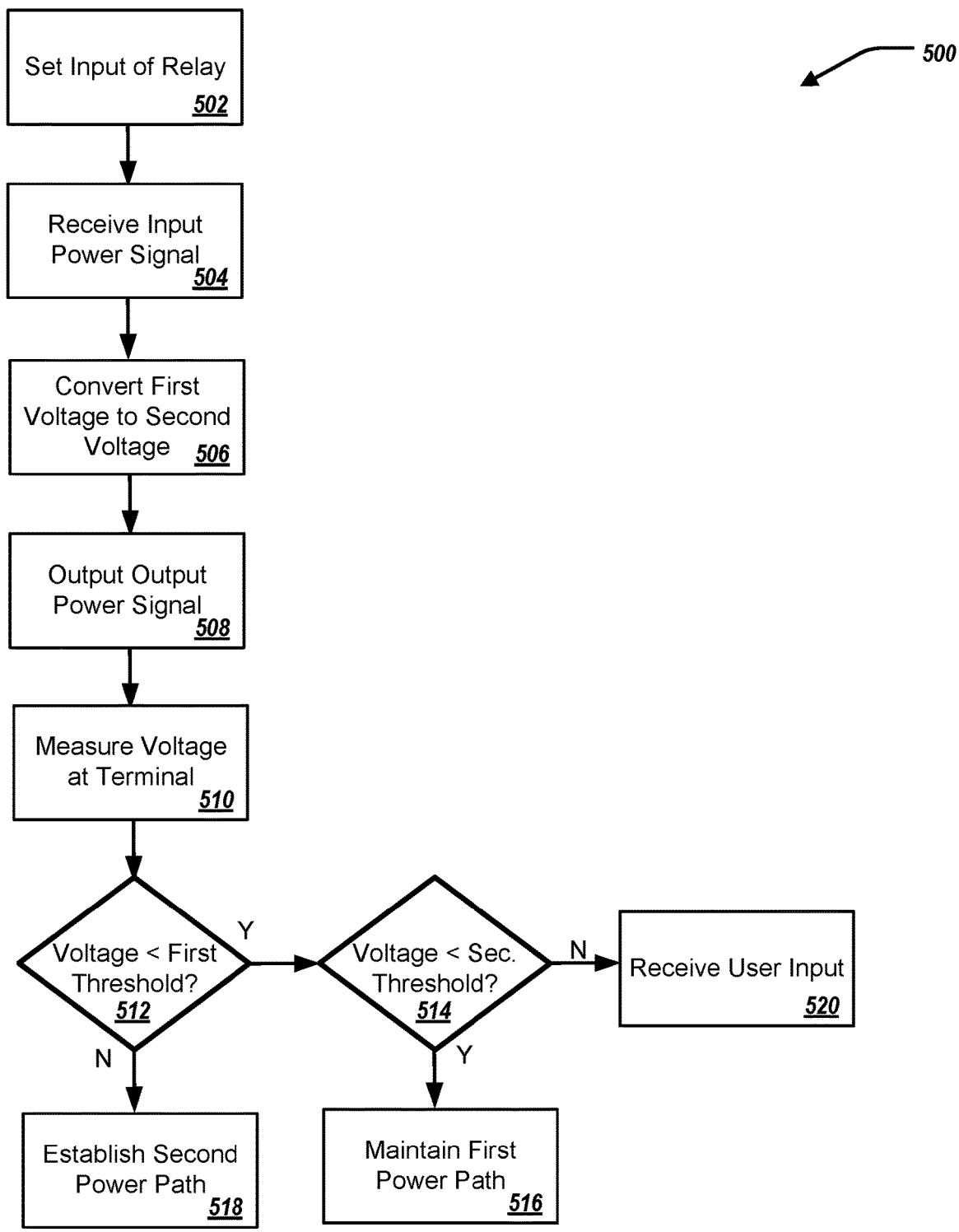
FIG. 5 illustrates a method for detecting a short/fault in a power supply unit of an information handling system.

FIG. 5 illustrates a flowchart depicting selected elements of an embodiment of a method 500 for detecting a short in a power supply of an information handling system. The method 500 may be performed by the information handling system 100, the PDU/ATS 208, and/or the PDU/ATS 308, with reference to FIGS. 1-4. It is noted that certain operations described in method 500 may be optional or may be rearranged in different embodiments.

The MCU 218 sets the input of the relay 216 to establish the first power path 230 between and the input of the PSU 206 and the low voltage output of the auxiliary PSU 210, at 502. The auxiliary PSU 210 receives the input power signal from the power source 204, at 504. The auxiliary PSU 210 converts a first voltage of the input power signal to a second voltage, at 506. The auxiliary PSU 210 outputs, at the low voltage output of the auxiliary PSU 210, the output power signal, at 508. The output power signal has the second voltage. The output power signal is provided through the resistor 212 and to the input of the relay 216. The MCU 218 measures the voltage at terminal 232, at 510. The MCU 218 determines, based on the measuring, whether the voltage at the terminal 232 is less than the first threshold, at 512. In some examples, the MCU 218 determines that the voltage at the terminal 232 is less than the first threshold (at 512), and in response, the MCU 218 determines, based on the measuring, whether the voltage at the terminal 232 is less than the second threshold, at 514. In some examples, the MCU 218 determines that the voltage at the terminal 232 is less than the second threshold (at 514), and in response, the MCU 218 maintains the first power path 230 such that the PSU 206 does not receive the input power signal. In other words, the PSU 206 does not receive the input power signal. In some examples, the MCU 218 determines that the voltage at the terminal 232 is greater than the first threshold (at 512), and in response, the MCU 218 sets the input of the relay 216 to establish the second power path 234 between and the input of the PSU 206 and the input power signal, at 518. In some examples, the MCU 218 determines that the voltage at the terminal 232 is greater than the second threshold (at 514), and in response, the MCU 218 receives user input indicting to apply the input power signal to the PSU 206, at 520. In some cases, the MCU 218, in response to the user input, sets the input of the relay 216 to establish the second power path 234 between and the input of the PSU 206 and the input power signal.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of detecting a short in a power supply unit (PSU), the method including:
    setting, by a microcontroller unit (MCU), an input of a relay to establish a first power path between an input of the PSU and a low voltage output of an auxiliary PSU;
    receiving, at the auxiliary PSU, an input power signal;
    converting, by the auxiliary PSU, a first voltage of the input power signal to a second voltage;
    outputting, at the low voltage output of the auxiliary PSU, an output power signal having the second voltage to provide the output power signal through a resistor and to the input of the relay;
    measuring, by the MCU, a voltage at a terminal between the resistor and the input of the relay;
    determining, by the MCU and based on the measuring, that the voltage at the terminal is less than a first threshold;
    in response to determining that the voltage at the terminal is less than the first threshold, determining, by the MCU and based on the measuring, that the voltage at the terminal is less than a second threshold;
    in response to determining that the voltage at the terminal is less than the second threshold:
        maintaining, by the MCU, the first power path such that the PSU does not receive the input power signal.

2. The method of claim 1, wherein the second voltage is less than the first voltage.

3. The method of claim 2, wherein the second voltage is approximately 5 volts.

4. The method of claim 1, further in response to determining that the voltage at the terminal is less than the second threshold, providing a notification indicating a fault of the PSU.

5. The method of claim 1, wherein setting the input of the relay to establish the first power path further includes:
    setting, by the MCU, a transistor to an off-state that is coupled to a control terminal of the relay such that the input of the relay is set to establish the first power path between the input of the PSU and the low voltage output of the auxiliary PSU.

6. The method of claim 5, wherein setting the transistor to the off-state includes setting a voltage of the transistor to 0 volts.

7. The method of claim 1, further comprising:
    determining, by the MCU and based on the measuring, that the voltage at the terminal is greater than the first threshold;
    in response to determining that the voltage at the terminal is greater than the first threshold:
        setting, by the MCU, the input of the relay to establish a second power path between the input of the PSU and the input power signal.

8. The method of claim 7, wherein setting the input of the relay to establish the second power path further includes:
    setting, by the MCU, a transistor to an on-state that is coupled to a control terminal of the relay such that the input of the relay is set to establish the second power path between the input of the PSU and the input power signal.

9. The method of claim 8, wherein setting the transistor to the on-state includes setting a voltage of the transistor to 5 volts.

10. The method of claim 1, further including:
    determining, by the MCU and based on the measuring, that the voltage at the terminal is greater than the second threshold;
    in response to determining that the voltage at the terminal is less than the second threshold, receiving user input indicating to apply the input power signal to the PSU; and
    in response to the user input, setting, by the MCU, the input of the relay to establish a second power path between the input of the PSU and the input power signal.

11. An apparatus for detecting a short in a power supply unit (PSU), the apparatus including:
a resistor;
a relay;
an auxiliary PSU configured to:
  receive an input power signal;
  convert a first voltage of the input power signal to a second voltage; and
  output, at a low voltage output, an output power signal having the second voltage to provide the output power signal through the resistor and to an input of the relay;
a microcontroller unit (MCU) configured to:
  set an input of the relay to establish a first power path between an input of the PSU and a low voltage output of the auxiliary PSU;
  measure a voltage at a terminal between the resistor and the input of the relay;
  determine, based on the measuring, that the voltage at the terminal is less than a first threshold;
  in response to determining that the voltage at the terminal is less than the first threshold, determine, based on the measuring, that the voltage at the terminal is less than a second threshold;
  in response to determining that the voltage at the terminal is less than the second threshold:
    maintain the first power path such that the PSU does not receive the input power signal.

12. The apparatus of claim 11, wherein the second voltage is less than the first voltage.

13. The apparatus of claim 12, wherein the second voltage is approximately 5 volts.

14. The apparatus of claim 11, the MCU further configured to determine that the voltage at the terminal is less than the second threshold, and in response, provide a notification indicating a fault of the PSU.

15. The apparatus of claim 11, further including:
a transistor coupled to a control terminal of the relay,
wherein the MCU is further configured to set the transistor to an off-state such that the input of the relay is set to establish the first power path between the input of the PSU and the low voltage output of the auxiliary PSU.

16. The apparatus of claim 15, wherein the MCU is further configured to set the transistor to the off-state by setting a voltage of the transistor to 0 volts.

17. The apparatus of claim 11, wherein the MCU is further configured to:
determine, based on the measuring, that the voltage at the terminal is greater than the first threshold;
in response to determining that the voltage at the terminal greater than the first threshold;
set the input of the relay to establish a second power path between the input of the PSU and the input power signal.

18. The apparatus of claim 17, further including:
a transistor coupled to a control terminal of the relay,
wherein the MCU is further configured to set the transistor to an on-state that is coupled to a control terminal of the relay such that the input of the relay is set to establish the second power path between the input of the PSU and the input power signal.

19. The apparatus of claim 18, wherein the MCU is further configured to set the transistor to the on-state by setting a voltage of the transistor to 5 volts.

20. The apparatus of claim 11, wherein the MCU is further configured to:
determine, based on the measuring, that the voltage at the terminal is greater than the second threshold;
in response to determining that the voltage at the terminal is less than the second threshold, receive user input indicating to apply the input power signal to the PSU; and
in response to the user input, set the input of the relay to establish a second power path between the input of the PSU and the input power signal.

* * * * *